US012638551B2

(12) United States Patent
Martinez et al.

(10) Patent No.: US 12,638,551 B2
(45) Date of Patent: May 26, 2026

(54) SYSTEM AND METHOD FOR PRESENCE AND PULSE DETECTION FROM WIRELESS SIGNALS

(71) Applicant: AERIAL TECHNOLOGIES INC., Montreal (CA)

(72) Inventors: Michel Allegue Martinez, Terrebonne (CA); Negar Ghourchian, Montreal (CA); David Grant, Santa Rosa Valley, CA (US); Francois Morel, Montreal (CA); Pauline Tranchant, Montreal (CA); Amir Minayi Jalil, Verdun (CA)

(73) Assignee: Aerial Technologies Inc., Montreal (CA)

( * ) Notice: Subject to any disclaimer, the term of this patent is extended or adjusted under 35 U.S.C. 154(b) by 0 days.

(21) Appl. No.: 18/519,361

(22) Filed: Nov. 27, 2023

(65) Prior Publication Data

US 2024/0085524 A1 Mar. 14, 2024

Related U.S. Application Data

(63) Continuation of application No. 17/902,070, filed on Sep. 2, 2022, now Pat. No. 11,828,872, which is a
(Continued)

(51) Int. Cl.
*G08B 21/02* (2006.01)
*G01S 7/00* (2006.01)
(Continued)

(52) U.S. Cl.
CPC .............. *G01S 7/415* (2013.01); *G01S 7/006* (2013.01); *G01S 13/003* (2013.01);
(Continued)

(58) Field of Classification Search
CPC ...................................................... G01S 7/415
(Continued)

(56) References Cited

U.S. PATENT DOCUMENTS 8,073,441 B1 12/2011 Unger et al.
8,461,988 B2 6/2013 Tran
(Continued)

FOREIGN PATENT DOCUMENTS

CA 3044480 A1 5/2018
CN 105828289 B 9/2019
(Continued)

OTHER PUBLICATIONS

Deng et al. "CC-DTW: An Accurate Indoor Fingerprinting Localization using Calibrated Channel State Information and Modified Dynamic Time Warping" Sensors, 19, No. 9, 1984.
(Continued)

*Primary Examiner* — Qutbuddin Ghulamali
(74) *Attorney, Agent, or Firm* — Rosenberg, Klein & Lee

(57) ABSTRACT

Systems and methods for detecting and monitoring human breathing, respiration, and heart rate using statistics about the wireless channel between two or more connected devices. A user is monitored for identifying patterns in the uses behavior that may allow the system to alert a caregiver to deviations in the user behavior that may be indicative of a potential issue, such as depression. A presence may be further detected in a sensing area through the detection of spectral components in the breathing frequency range of comprises user includes transforming phase difference between spatial streams and amplitude of the samples representing frequency response of the channel for any frequency value into frequency domain to perform frequency analysis. Statistical analysis may be performed on the frequency space provided by the transformation. Micro
(Continued)

motions may also be detected by detecting presence in a sensing area through the detection of spectral components in the micro motion frequency range.

15 Claims, 10 Drawing Sheets

Related U.S. Application Data continuation of application No. 17/006,579, filed on Aug. 28, 2020, now Pat. No. 11,448,726.

(60) Provisional application No. 62/897,222, filed on Sep. 6, 2019, provisional application No. 62/893,109, filed on Aug. 28, 2019.

(51) Int. Cl.

| | |
|---|---|
| *G01S 7/41* | (2006.01) |
| *G01S 13/00* | (2006.01) |
| *G01S 13/88* | (2006.01) |
| *G08B 21/18* | (2006.01) |

(52) U.S. Cl.
CPC ............ *G01S 13/886* (2013.01); *G08B 21/02* (2013.01); *G08B 21/182* (2013.01)

(58) Field of Classification Search
USPC ...................................................... 340/573.1
See application file for complete search history.

(56) References Cited

U.S. PATENT DOCUMENTS

| | | | |
|---|---|---|---|
| 8,864,663 | B1 | 10/2014 | Kahn et al. |
| 9,219,790 | B1 | 12/2015 | Filev et al. |
| 9,414,115 | B1 | 8/2016 | Mao et al. |
| 9,703,892 | B2 | 7/2017 | Ramer et al. |
| 9,854,292 | B1 | 12/2017 | Matthews et al. |
| 9,867,548 | B2 | 1/2018 | Le et al. |
| 9,985,846 | B1 | 5/2018 | Roman et al. |
| 10,045,191 | B2 | 8/2018 | Nguyen et al. |
| 10,374,646 | B1 | 8/2019 | Fletcher |
| 10,419,880 | B1 | 9/2019 | Long et al. |
| 10,818,384 | B1 | 10/2020 | Peterson et al. |
| 10,999,705 | B2 | 5/2021 | Martinez et al. |
| 11,017,688 | B1 | 5/2021 | Arazi |
| 11,039,278 | B1 | 6/2021 | Carreiro et al. |
| 11,082,109 | B2 | 8/2021 | Martinez et al. |
| 11,218,769 | B2 | 1/2022 | Martinez et al. |
| 11,448,726 | B2 | 9/2022 | Martinez et al. |
| 11,523,253 | B2 | 12/2022 | Martinez et al. |
| 11,586,952 | B2 | 2/2023 | Martinez et al. |
| 11,593,837 | B2 | 2/2023 | Martinez et al. |
| 11,611,362 | B2 | 3/2023 | Kang et al. |
| 2002/0188668 | A1 | 12/2002 | Jefferey et al. |
| 2006/0224938 | A1 | 10/2006 | Fikes et al. |
| 2007/0024580 | A1 | 2/2007 | Sands et al. |
| 2007/0266395 | A1 | 11/2007 | Lee et al. |
| 2008/0262909 | A1 | 10/2008 | Li et al. |
| 2010/0242063 | A1 | 9/2010 | Sianey et al. |
| 2011/0029277 | A1 | 2/2011 | Chowdhary et al. |
| 2011/0117924 | A1 | 5/2011 | Brunner et al. |
| 2011/0129047 | A1 | 6/2011 | Mashino et al. |
| 2011/0258039 | A1 | 10/2011 | Patwa et al. |
| 2012/0053472 | A1 | 3/2012 | Tran |
| 2012/0135733 | A1 | 5/2012 | Cormier et al. |
| 2012/0289147 | A1 | 11/2012 | Raleigh et al. |
| 2012/0324494 | A1 | 12/2012 | Burger et al. |
| 2013/0011597 | A1 | 1/2013 | Niyama et al. |
| 2013/0014136 | A1 | 1/2013 | Bhatia et al. |
| 2013/0028443 | A1 | 1/2013 | Pance et al. |
| 2013/0053990 | A1 | 2/2013 | Ackland |
| 2013/0076528 | A1 | 3/2013 | Boettner et al. |
| 2013/0102256 | A1 | 4/2013 | Cendrillon et al. |
| 2013/0326554 | A1 | 12/2013 | Shkedi |
| 2014/0033240 | A1 | 1/2014 | Card, II |
| 2014/0181100 | A1 | 6/2014 | Ramer et al. |
| 2014/0223467 | A1 | 8/2014 | Hayton et al. |
| 2014/0278389 | A1 | 9/2014 | Zurek et al. |
| 2014/0358012 | A1 | 12/2014 | Richards et al. |
| 2015/0026708 | A1 | 1/2015 | Ahmed et al. |
| 2015/0050923 | A1 | 2/2015 | Tu et al. |
| 2015/0092747 | A1 | 4/2015 | Ganesan |
| 2015/0110471 | A1 | 4/2015 | Zheng |
| 2015/0113556 | A1 | 4/2015 | Weast et al. |
| 2015/0121428 | A1 | 4/2015 | Nguyen et al. |
| 2015/0365787 | A1 | 12/2015 | Farrell |
| 2016/0057472 | A1 | 2/2016 | Gupta et al. |
| 2016/0105700 | A1 | 4/2016 | Collins et al. |
| 2016/0105770 | A1 | 4/2016 | Christian |
| 2016/0127766 | A1 | 5/2016 | Luk et al. |
| 2016/0174185 | A1 | 6/2016 | Ramakrishnan et al. |
| 2016/0253710 | A1 | 9/2016 | Publicover et al. |
| 2016/0277529 | A1 | 9/2016 | Chen et al. |
| 2016/0315682 | A1 | 10/2016 | Liu et al. |
| 2016/0337701 | A1 | 11/2016 | Hare et al. |
| 2016/0344779 | A1 | 11/2016 | Jain et al. |
| 2017/0032191 | A1 | 2/2017 | Ackland |
| 2017/0068790 | A1 | 3/2017 | Fuerst |
| 2017/0135635 | A1 | 5/2017 | Bostick et al. |
| 2017/0160089 | A1 | 6/2017 | Jang et al. |
| 2017/0293729 | A1 | 10/2017 | Movva |
| 2017/0315711 | A1 | 11/2017 | Adams |
| 2017/0332192 | A1 | 11/2017 | Edge |
| 2017/0354349 | A1 | 12/2017 | Mohapatra et al. |
| 2017/0366955 | A1 | 12/2017 | Edge |
| 2018/0008207 | A1 | 1/2018 | Sarkela et al. |
| 2018/0035072 | A1 | 2/2018 | Asarikuniyii et al. |
| 2018/0091952 | A1 | 3/2018 | Sant et al. |
| 2018/0181094 | A1 | 6/2018 | Funk et al. |
| 2018/0184165 | A1 | 6/2018 | Maughan et al. |
| 2018/0330406 | A1 | 11/2018 | Deluca et al. |
| 2018/0366228 | A1 | 12/2018 | Buck et al. |
| 2019/0051342 | A1 | 2/2019 | Wootton et al. |
| 2019/0174170 | A1 | 6/2019 | Chen |
| 2019/0178980 | A1* | 6/2019 | Zhang .................. A61B 5/7267 |
| 2019/0188756 | A1 | 6/2019 | Bradley et al. |
| 2019/0246371 | A1 | 8/2019 | Hwang et al. |
| 2019/0252079 | A1 | 8/2019 | Constantin et al. |
| 2019/0306023 | A1 | 10/2019 | Vassseur et al. |
| 2020/0036592 | A1 | 1/2020 | Kholaif |
| 2020/0090022 | A1 | 3/2020 | Ma et al. |
| 2020/0112939 | A1 | 4/2020 | Scharf et al. |
| 2020/0120384 | A1 | 4/2020 | Armaly |
| 2020/0133383 | A1 | 4/2020 | Ahistrom et al. |
| 2020/0186231 | A1 | 6/2020 | Cao |
| 2020/0186321 | A1* | 6/2020 | Hwang ................. H04W 72/23 |
| 2020/0226388 | A1 | 7/2020 | Ghessassi |
| 2020/0265700 | A1 | 8/2020 | Bergman et al. |
| 2020/0292572 | A1 | 9/2020 | Bateni et al. |
| 2020/0296463 | A1 | 9/2020 | Martinez et al. |
| 2020/0302478 | A1 | 9/2020 | Martinez et al. |
| 2020/0303046 | A1 | 9/2020 | Martinez et al. |
| 2020/0327430 | A1 | 10/2020 | Martinez et al. |
| 2020/0328793 | A1 | 10/2020 | Martinez et al. |
| 2020/0329343 | A1 | 10/2020 | Martinez et al. |
| 2020/0383119 | A1* | 12/2020 | Sun ..................... H04B 7/0626 |
| 2020/0397365 | A1 | 12/2020 | Zhang et al. |
| 2021/0063537 | A1 | 3/2021 | Martinez et al. |
| 2021/0120370 | A1 | 4/2021 | Martinez et al. |
| 2021/0352441 | A1 | 11/2021 | Liu et al. |
| 2022/0060234 | A1 | 2/2022 | Martinez et al. |
| 2022/0070633 | A1 | 3/2022 | Ghoshai et al. |
| 2022/0167050 | A1 | 5/2022 | Martinez et al. |
| 2022/0256429 | A1 | 8/2022 | Martinez et al. |

FOREIGN PATENT DOCUMENTS

| | | |
|---|---|---|
| WO | 2016187458 A1 | 11/2016 |
| WO | 2018094502 A1 | 5/2018 |
| WO | 2020170221 A1 | 8/2020 |

(56) References Cited

FOREIGN PATENT DOCUMENTS

| WO | 2020240526 | A1 | 12/2020 |
| WO | 2021084519 | A1 | 5/2021 |

OTHER PUBLICATIONS

Ghourchain et al.; "Real Time Indoor Localization in Smart Homes using Semi-Supervised Learning", 29th AAAI Conference on Innovative Applications, pp. 4670-4677, 2017.

Zhou et al.; "Device Free Localization based on CSI Fingerprints and Deep Neural Networks", 15th IEEE Int. Conf. on Sensing, Communication and Networking, 2018.

Xi et al.; "Electronic Frog Eye: Counting Crowd using WiFi", IEEE Infocom 2014—IEEE Conference on Computer Communications, pp. 361-369, 2014.

Xu et al.; "SCPL: Indoor Device-Feee Multi-Sbject Counting and Localization using Radio Signal Strength", Proceedings of the 12th international conference on Information Processing in Sensor Networks, pp. 79-90, 2013.

Wang et al.; "CSI Based Fingerprinting for Indoor Localization: A Deep Learning Approach", IEEE Trans. Vehicular Technology, vol. 66, No. 1, pp. 763-776, 2016.

Wang et al.; "E-Eyes: Device-Free Localization-Orientated Activity Identification using Fine-Grained WIFI Signatures"; MobiCom'14, pp. 617-628, 2014.

* cited by examiner

230

210

200

220

9.5m

260

240

250

14.5m

SYSTEM AND METHOD FOR PRESENCE AND PULSE DETECTION FROM WIRELESS SIGNALS

CROSS-REFERENCE TO RELATED APPLICATIONS

This patent application claims the benefit of priority from U.S. patent application Ser. No. 17/902,070 filed Sep. 2, 2022; which itself claims the benefit of priority from U.S. patent application Ser. No. 17/006,579 filed Aug. 28, 2020 which has issued as U.S. Pat. No. 11,448,726; which itself claims the benefit of priority from U.S. Provisional Patent Application No. 62/893,109 filed Aug. 28, 2019 and U.S. Provisional Patent Application No. 62/897,222 filed Sep. 6, 2019, the contents of each being incorporated herein by reference.

FIELD OF THE INVENTION

The present disclosure is generally related to motion and activity detection using Wi-Fi or a radio signal.

BACKGROUND OF THE INVENTION

Motion detection is the process for detecting a change in the position of a user relative to its surroundings. Motion detection can be accomplished by a software-based monitoring algorithm. A motion detection system can analyze the type of motion to see if an alarm is warranted. Wi-Fi localization refers to translating observed Wi-Fi signal strengths into locations.

Wi-Fi-based systems should be able to detect if a user is present in the environment even when no displacement or limb movement is produced. One solution is to use the periodic distortions caused by chest and lung breathing motion. Fine-grained channel state information (CSI) provided by pairs of Wi-Fi devices have been used to measure breathing rates, by analyzing time series in time and frequency domains often with an estimation error below one breathing cycle per minute. Detecting the effects of the respiration of a human being is desirable and can be used for presence detection and/or health monitoring. There is a need in the art for passive monitoring of human respiration from CSI.

Other aspects and features of the present invention will become apparent to those ordinarily skilled in the art upon review of the following description of specific embodiments of the invention in conjunction with the accompanying figures.

SUMMARY OF THE INVENTION

The present disclosure includes systems and methods that use a pair of connected devices in a sensing area to detect whether there is user presence and estimate the user's breathing rate in the frequency domain. Detection of movement or no movement occurs using passive Wi-Fi or radio signals. Biorhythm, such as heart rate and respiration, is also detected and used as a source of positioning and localization. Activity data and engagement level data associated with the user are stored for a plurality of time periods. One or more time periods are identified where the stored user activity data and the stored engagement level data are correlated. Current activity data and current engagement level data are compared to identify one or more cycles. When there is a deviation in the cycles, an alert score is incremented and once the alert score is above a threshold, an alert is sent to a device associated with the user.

DETAILED DESCRIPTION

Systems and methods are provided for detecting and monitoring human breathing using statistics about the wireless channel between two or more connected devices, and more particularly for detecting of various levels of breathing, respiration, and heart rate for pulse detection of a user within the Wi-Fi range. Further embodiments include methods for detecting presence in a sensing area through the detection of spectral components in the breathing frequency range of beings, as well as for transforming phase difference between spatial streams and amplitude of the samples representing frequency response of the channel for any frequency value into frequency domain to perform frequency analysis; and performing statistical analysis on the frequency space provided by the transformation. Further, micro motions may be detected by detecting presence in a sensing area through the detection of spectral components in the micro motion frequency range. Some embodiments may include systems for sensing breathing of a human using a Wi-Fi motion detection.

Figure 1:
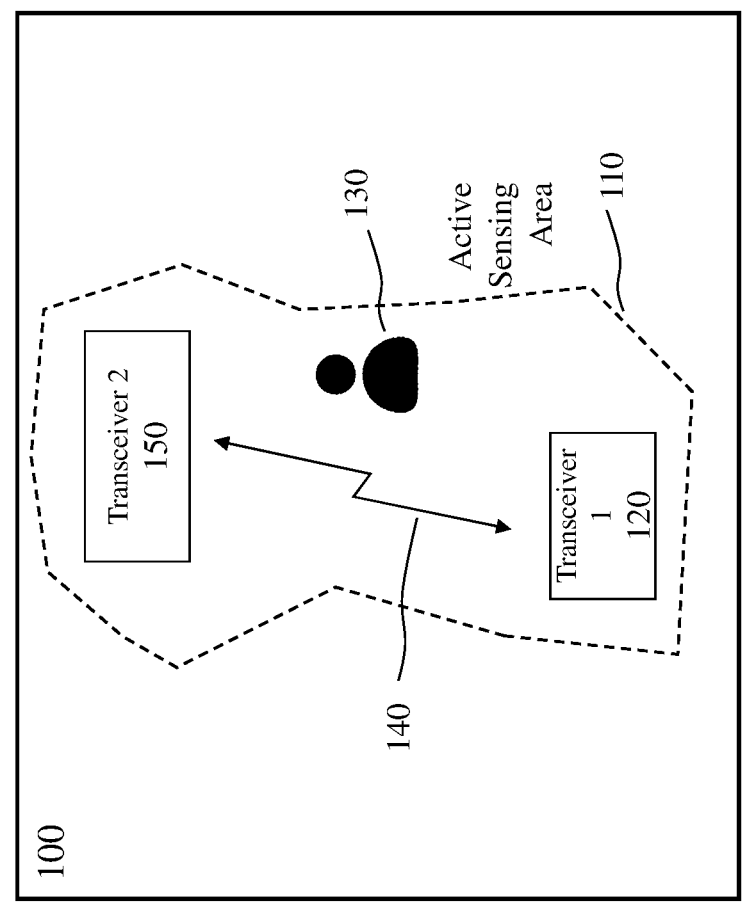
FIG. 1 illustrates a system able to sense objects within a sensing area via wireless signals.

FIG. 1 illustrates a systems for detecting presence and/or estimate the breathing rate of a user 130 while analyzing information about the state of the wireless channel between two connected devices 120 (transceiver 1) and 150 (transceiver 2), independently from the particular network topology in which these devices are associated. An example can be an access point (AP) connected to a client station (STA) such as a Wi-Fi-enabled TV in IEEE 802.11n and/or IEEE 802.11 ac. The wireless link between the devices 120 and 150 is represented by 140, where the state of the channel, frequency and phase responses, are estimated accordingly to the standard IEEE 802.11n and/or IEEE 802.11 ac. This information is reported as CSI data. The effective area where the state of the wireless channel can be estimated is 110. The area 100 is any space that belongs to any type of building where the frequency response and phase response of the channel can be estimated.

A statistical approach for channel frequency response that uses distortions caused by the chest, lung, abdomen and other body parts breathing movements of a user 130 is implemented to estimate breathing rate. In order to demonstrate the effectiveness of the proposed method, an example of the measured breathing rate is described herein. This approach allows estimating the breathing of a user even though the user is not in the direct path between the two devices that are connected exchanging/estimating the frequency and phase responses of the wireless channel between the devices.

Figure 2:
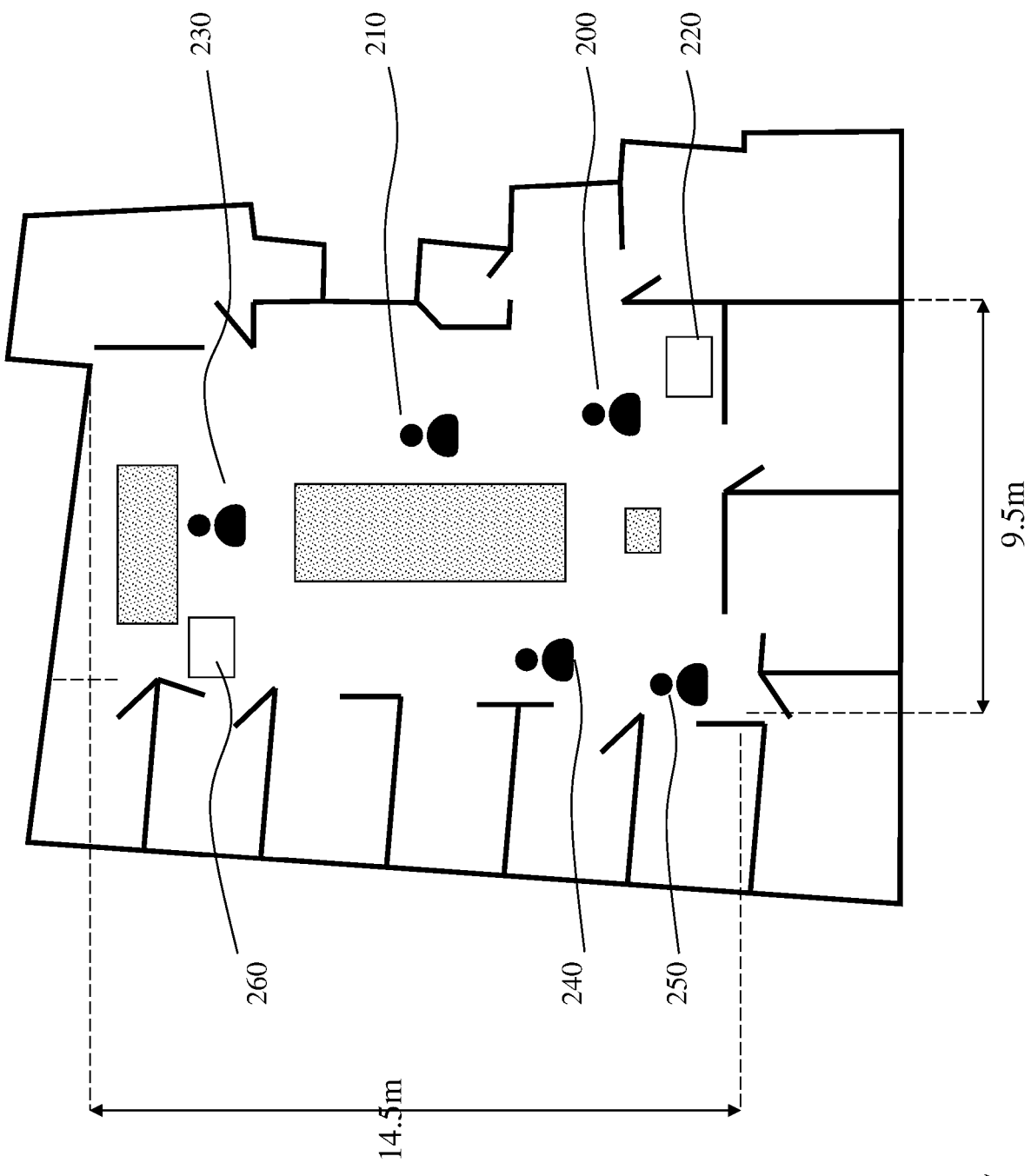
FIG. 2 illustrates a test case scenario which can be considered a large space used to exhibit the capabilities and efficiency of the methods proposed herein.

As an example, two Wi-Fi-enabled devices following IEEE 802.11ac standard 220 and 260 were used as illustrated in FIG. 2. In the channel estimation process, one device acts as a transmitter and the other one as a receiver, in a N_tx×N_rx multiple input multiple output (MIMO) system with N_tx transmitting antennas and N_rx receiving antennas. The Wi-Fi signal propagates between the transmitter and receiver through multiple spatial streams using Orthogonal Frequency Division Multiplexing (OFDM). In this example, used to demonstrate the approach proposed herein, CSI can be obtained at device 220 and/or 260. A sampling rate of 33.33 Hz, which is low compared to the state-of-the-art approaches, was fixed by using an echo command in 220, which generates traffic in the link between devices 220 and 260 making possible the estimation of the frequency response and phase response of the channel reported as CSI data. This sampling rate is used as an example and shall not limit the scope of the present approach. CSI characterizes the signal propagation between 220 and 260, and provides information on signal distortions such as attenuation, scattering, reflections, that are caused by the configuration of the environment and human motion interacting with the wireless signal used by devices 220 and 260.

Devices 220 and 260 were placed 12 meters away from each other in a large room, with tables, desks, computers and other little objects in between the devices. FIG. 2 depicts device placement (220, 260) and floor plan of the environment setup. Several metadata files containing CSI information were captured. In the breathing condition a user was breathing in a steady and controlled fashion, matching the inhale-exhale pace to an auditory metronome. The user was staying still at several locations in the environment indicated by 200, 210, 230, 240 or 250. At each location, the user was either lying down on the ground or sitting still on a chair. The same number of captures was taken in each position, sitting or lying. Additional captures were performed when nobody was present in the environment, which generates the baseline condition in order to compare signals in the breathing condition, and signals with no one within the sensing area.

Figure 3:
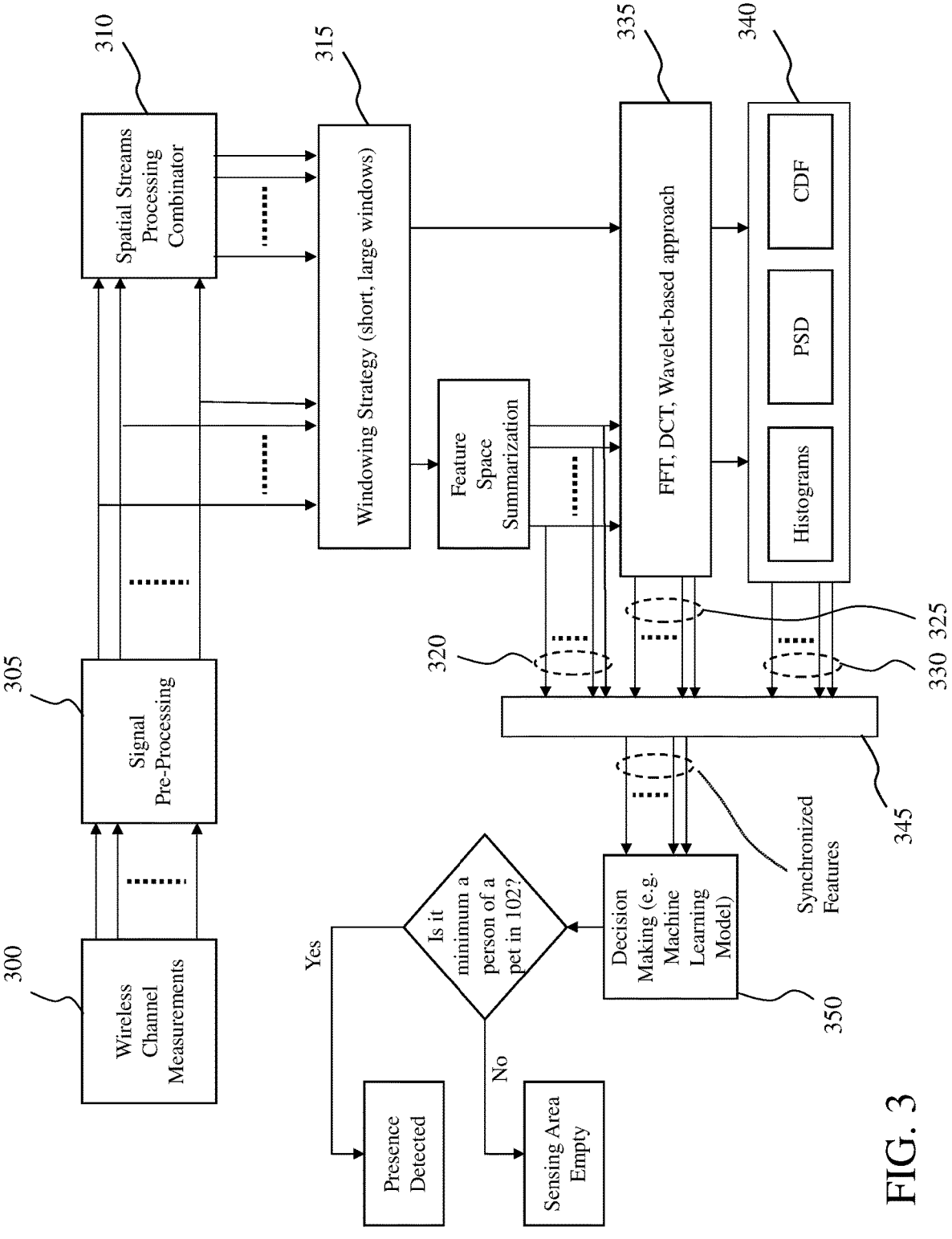
FIG. 3 is a flow diagram of the statistical-based approach proposed herein in order to detect presence through breathing rate detection.

The method analyzes flows of both magnitude and phase responses of the wireless channel between connected devices in multiple frequencies and spatial streams in MIMO channels. This is referred to as raw data or wireless channel measurements 300 in FIG. 3, which is the input into the method. A signal pre-processing module 305 is proposed right after module 300. Module 300 provides stable signals to the following modules. Some packages are discarded due to different reasons such as a defective estimation of the state of the frequency and/or impulse responses of the channel. The damaged packages are automatically detected and discarded. Module 310 is a combination of different spatial streams in MIMO systems. As an example, the phase difference between two different spatial streams for all the available subcarriers or frequency components is computed and transferred to module 315. Module 315 performs a windowing strategy to analyze data either in real-time by using short window sizes, (e.g., 128 time samples (n) for all available subcarriers or frequency components), or by using large sizes of windows for analysis of the average breathing rate, (e.g., more than 4,096 samples in a sampled signals captured with sampling rate range of 10 Hz to 100 Hz). Module 315 can receive time domain series directly from the module 305, having access to stable time series without any combination of spatial streams applied to the time series.

Some examples of dimensionality of the time series, several captures were obtained containing wireless channel measurements 300 with 1,392 vectors (here named components) of CSI time series, from 58 subcarriers for each of 24 antenna phase differences while Ntx=4 and Nrx=4.

One of the outputs of module 315 is used in a first feature set referred to as level 1. This level 1 will provide features directly taken from the windowing strategy implemented in module 315 and will be summarized as time domain features to the bus of features 345, which is in charge of synchronizing all the features that were extracted at the different levels 1, 2 and 3, corresponding to the modules 320, 325, and 330, respectively. The second output of module 315 is an input to the domain conversion module 335. In module 335, conversion from time-domain signals or time series into a different domain is performed. Some transformations performed in module 335 are, but not limited to, a discrete fourier transform (DFT), using the fast fourier transform (FFT) for example, or a discrete cosine transform (DCT), or any other transform related to frequency domain, or any wavelet transformation. In wavelet transform, the signal is decomposed in terms of some time-limited basic functions that have two degrees of freedom: scale (like frequency in sin function) which determines how compressed/stretchered the basic function is, and shift, which determines the pace where the basic function stands. Those basic functions are time-limited and there is a wide choice of basic functions for correlating with breathing measurements. The similarity between the basic function of wavelet transform and breathing signal facilitates a better extraction of breathing components from the signal.

Any of the above-mentioned mathematical transforms are applied for each time series provided through module 315 or a subset of components provided by the module 315. Only frequencies between 0.17 Hz and 0.70 Hz are considered in subsequent processing since these range covers the limits of human breathing rates. Module 335 creates inputs to the bus of features 345 and also to the module 340 that performs statistical analysis from the transformations performed in processing module 335. The statistical processing module 340 can perform any statistical summary on the input series data, either processing independent components or summarizing those independent component statistics that are parallel data series in the domain in which the data series were yielded to processing module 340. Some of those statistical analyses or summaries are histograms, power spectrum density (PSD) analysis, cumulative distribution function (CDF) and/or the probability density function (PDF). Processing module 340 then generates statistics that are used as statistical features of level 3 (330). At the decision making module 350, the question regarding whether or not there is user presence shall be answered.

All the features that were synchronized in the features bus 345 are used by decision making module 350 in decision making tasks that can use unsupervised or supervised machine learning models.

The decision making module 350 aim to use features generated in features bus 345 and build a mathematical model that automatically distinguishes between the baseline condition where no user related motion or micro motion is detected and the breathing condition where at least one user is present. Two different strategies were employed to make this binary decision, which could be categorized into unsupervised and supervised models based on the validation method.

In unsupervised approach only the features extracted from CSI data is used to build mathematical models. Some of those techniques include but not limited to distance-based clustering such as Gaussian mixture models (GMM), density-based clustering such as DBSCAN, centroid-based clustering such as kmeans and kmedians clustering, hierarchical clustering such as Agglomerative clustering, and Bayesian clustering algorithm such as latent dirichlet allocation (LDA) and hierarchical dirichlet processes (HDP). An example of such unsupervised methods that was applied in decision making module 350 is kmeans clustering, wherein a distance metric is defined between all the data points and then the whole observations is categorized into sub-groups based on the distance to the centroid of breathing condition and baseline condition.

In supervised approach, in addition to features extracted from CSI data, for a small portion of observation data, the corresponding ground truth obtained during the validation process is also used to build the mathematical models of baseline and breathing conditions. Some of those linear and non-linear supervised techniques include but not limited to, support vector machines (SVM), decision trees, k-nearest neighbor (KNN) classification, naïve bayes (NB), and deep neural networks (DNN). An example of such classification method that was applied in decision making module 350 is an SVM classifier with radial basis function (RB F) kernel that, based on some initial training from labelled data, builds the general model for classifying breathing and baseline conditions.

Figure 4:
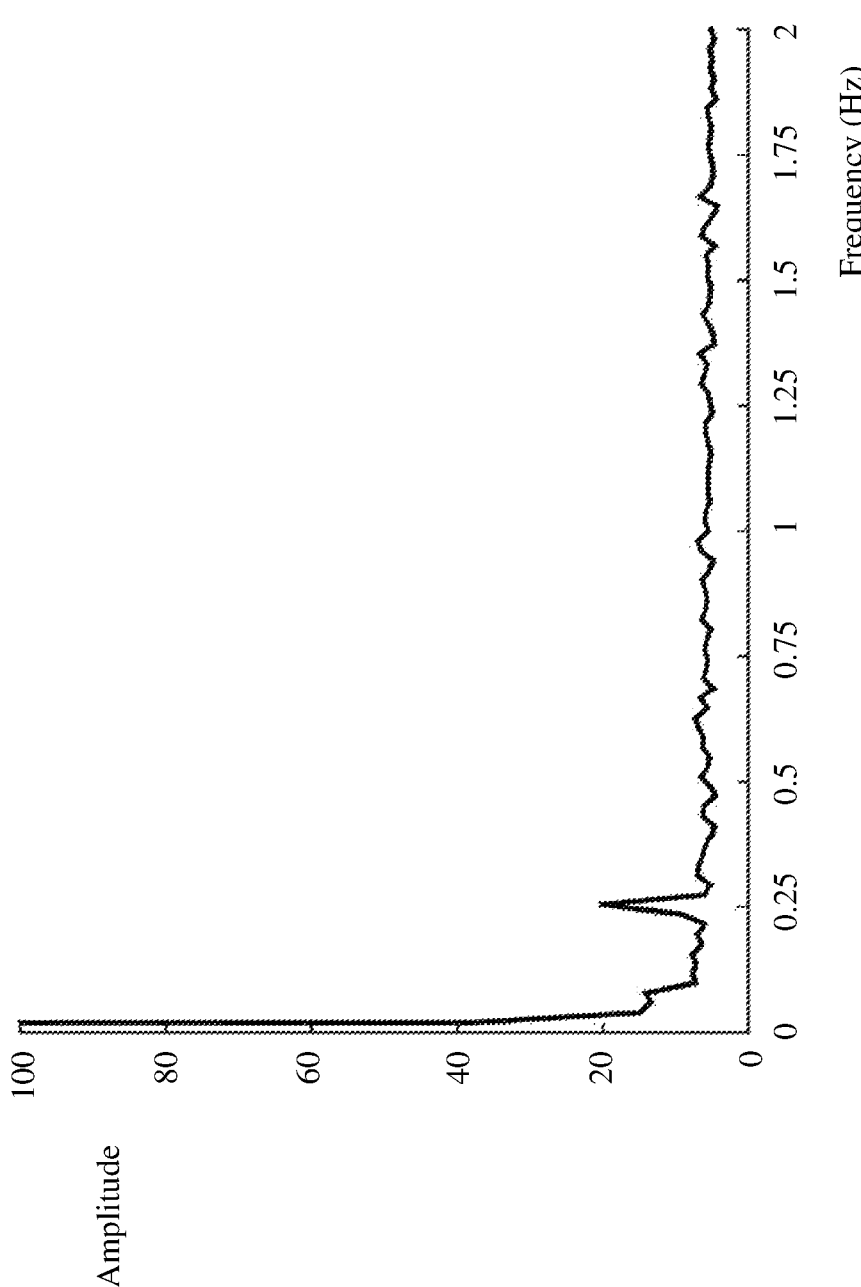
FIG. 4 is an example of the spectrum obtained from the measured wireless signal.

As an example, a simple approach is to select the frequency component exhibiting a peak which can be considered as a bin that will potentially correspond to the user's breathing rate as illustrated in FIG. 4. For each component, the frequency that yielded the maximum amplitude in the FFT output can be selected.

Figure 5:
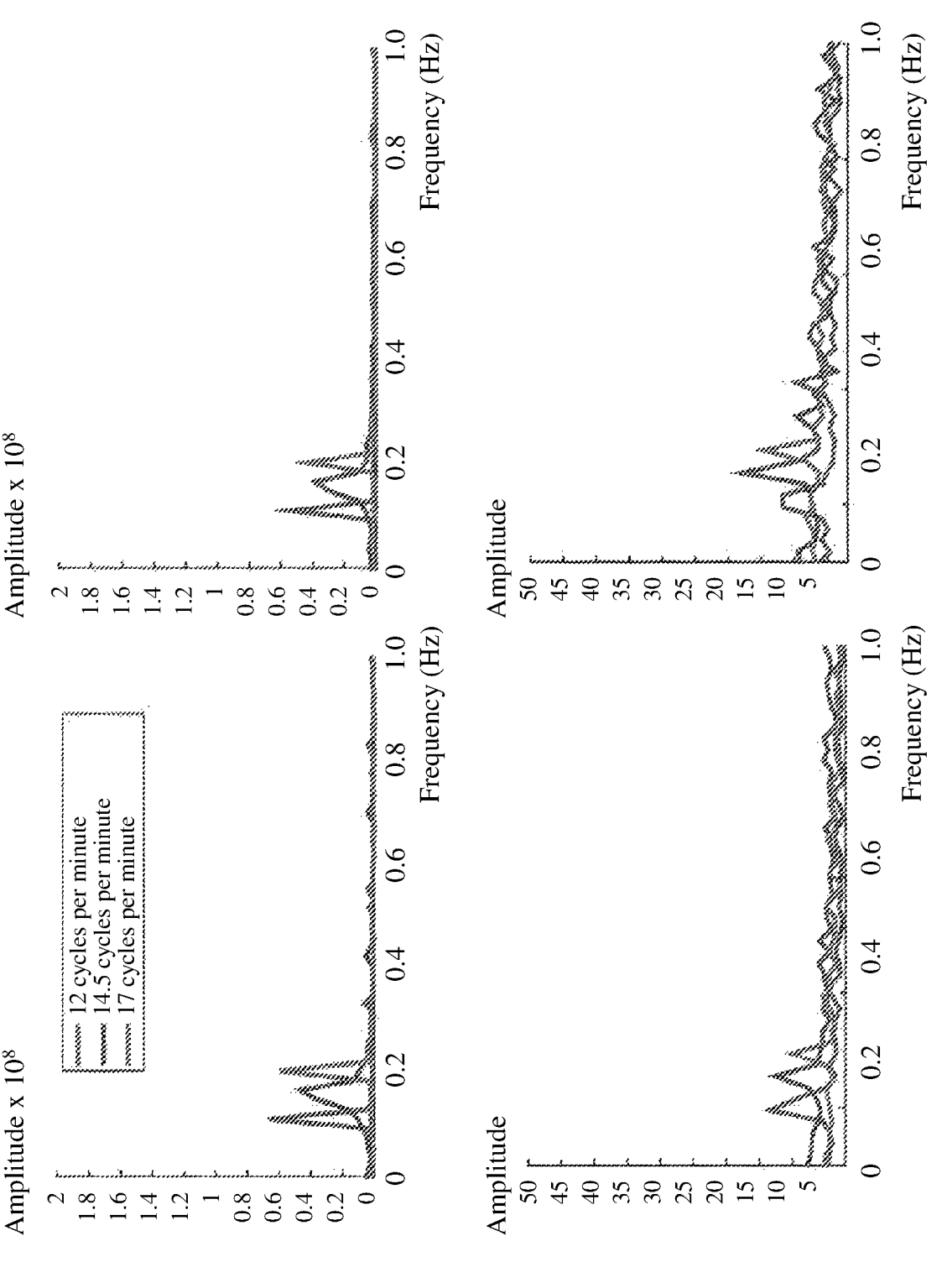
FIG. 5 is an example of the ground truth data employed to validate the method proposed herein and the spectrum summarized from the measured wireless signals used for the breathing rate estimation.

As an example, tests were performed and the following pipeline was applied to wireless channel measurements for which the breathing rate was derived from a NEULOG respiration monitor logger sensor. The sensor is connected to a monitor belt that is attached to the user's ribcage, and records variations in air pressure from the belt at 50 samples per second. CSI and NEULOG data were collected simultaneously during more than 10 captures of one minute each, per each of the locations 200, 210, 230, 240, and 250 as illustrated in FIG. 2. Captures for different breathing rate, mixed breathing rate were collected and positions such as sitting and lying were used during the validation phase. Estimated rates from CSI data, using the procedure described above, were very close to rates estimated from NEULOG data, with errors below 0.012 Hz (0.72 breathing cycle per minute) and a mean error of 0.0066 Hz (0.40 breathing cycle per minute) over the measured captures, confirming the adequacy of the procedure to estimate breathing rates from CSI. Fourier transforms for NEULOG and CSI data are presented in FIG. 5.

The procedure described above was applied to compare CSI data in the breathing and in the baseline conditions. Two features were extracted from each capture: the number of components with an amplitude peak that matched the most frequent one (over 1392 components), and the average amplitude of these peaks for the selected components only.

Figure 6:
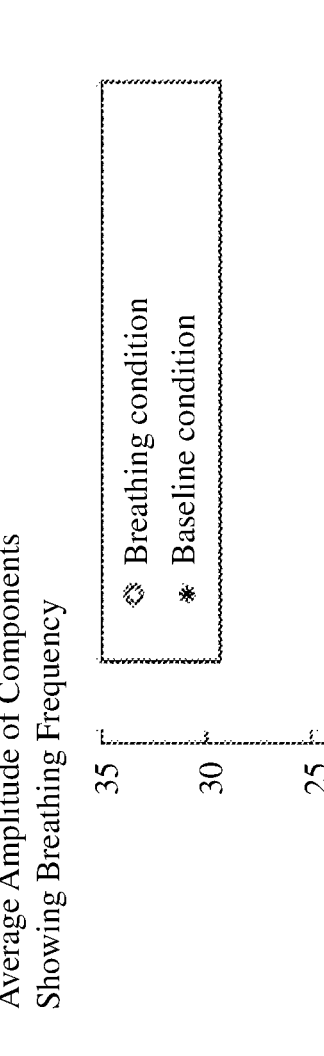
FIG. 6 illustrates an example of the feature space generated with the proposed method.
Figure 6:
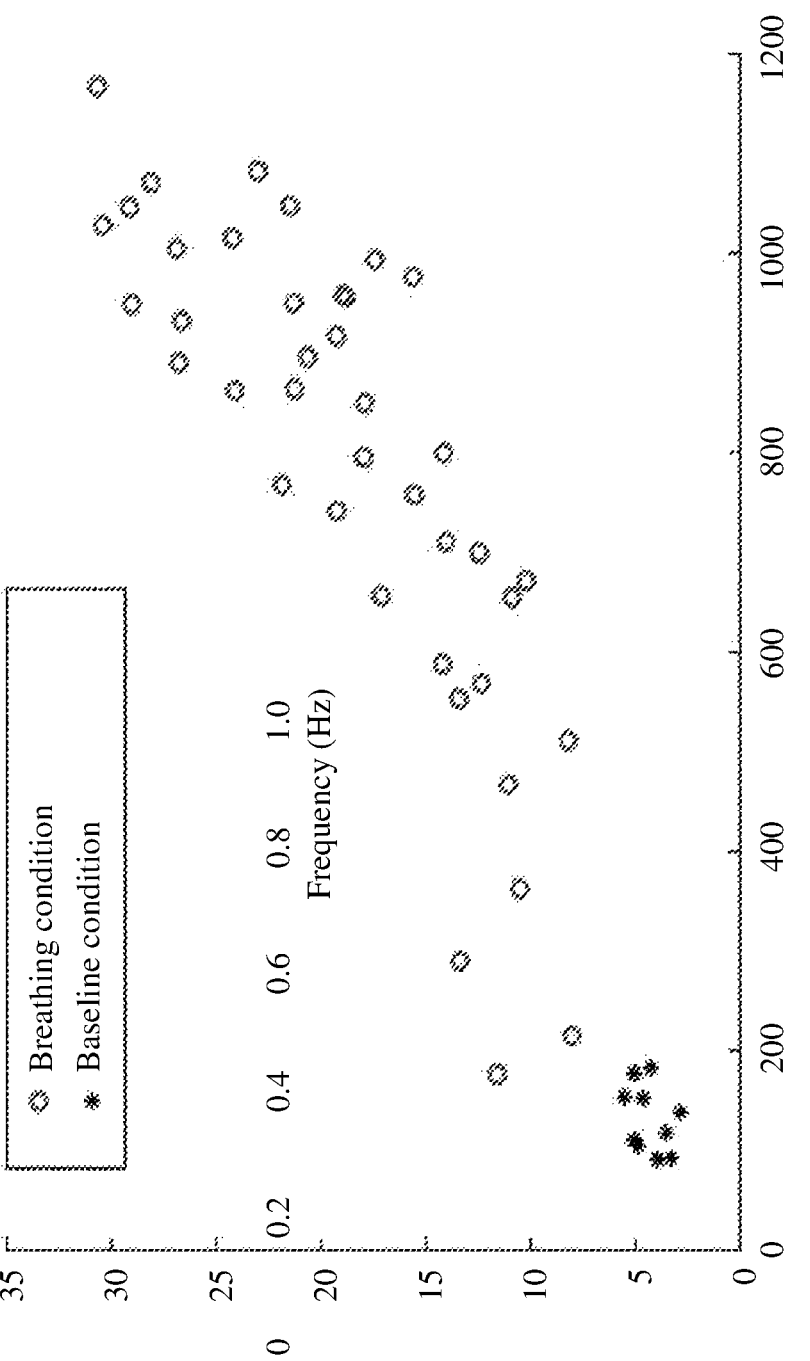

As can be seen in FIG. 6, captures for the breathing and baseline conditions can be distinguished using the method proposed herein.

Figure 7:
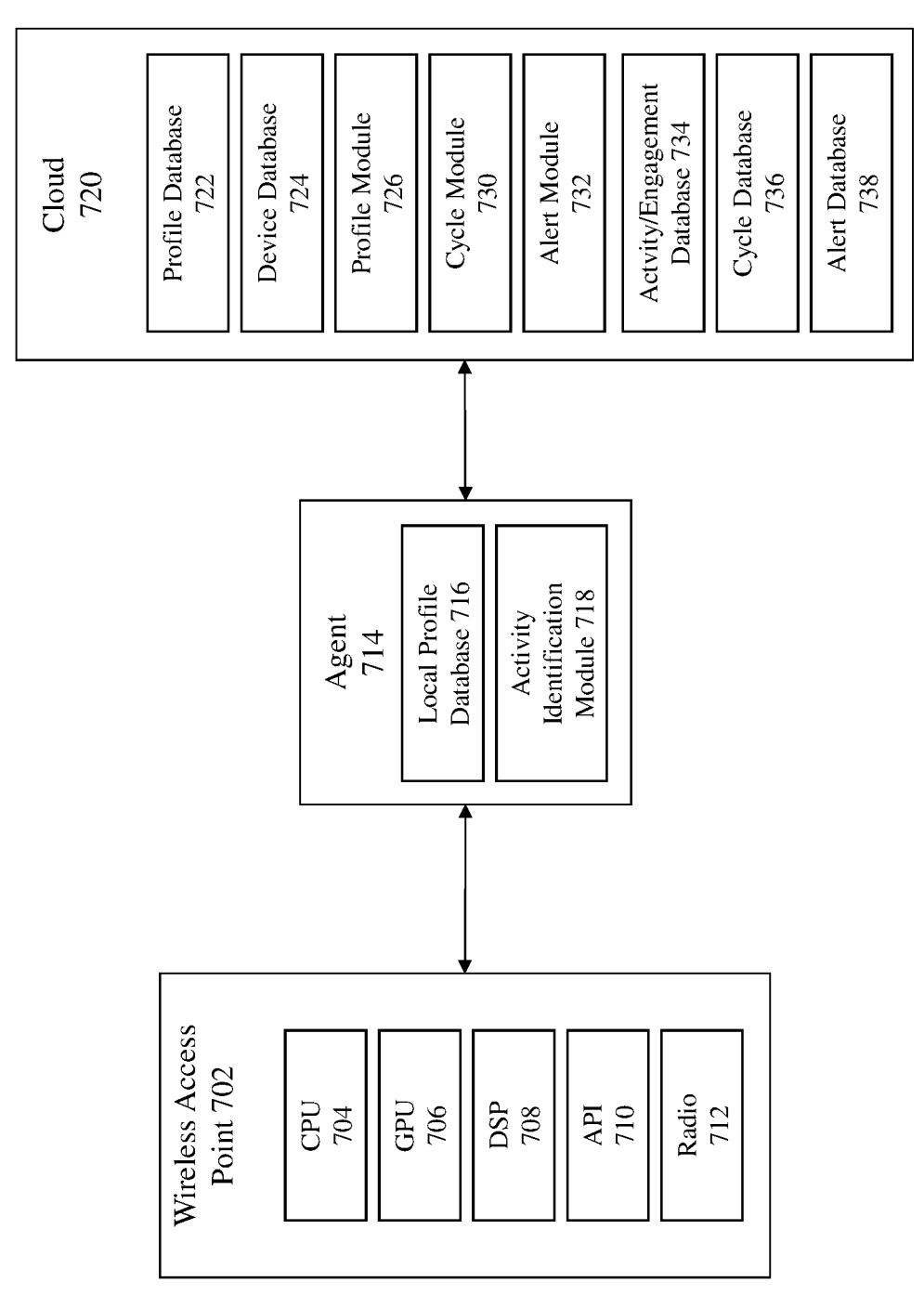
FIG. 7 illustrates a Wi-Fi motion detection system.

FIG. 7 illustrates components of the system. The wireless access point 702 is a Wi-Fi access point. The Wi-Fi access point includes but not limited to an IEEE 802.11ac or 802.11n or above access points. The wireless transceiver of the wireless access point 702 is in communication with the further stationary device over a corresponding further one of the at least one radio frequency communication link. The wireless access point 702 is configured to record a further channel state information data set for the further one of the at least one radio frequency communication link at a corresponding time. In an embodiment, the determining the activity of the user in the environment includes determining the activity of the user in the environment based on a comparison of the further channel state information data set to each of the at least one channel state information profile of each of the plurality of activity profiles. In an embodiment, the activity is determined based on a sum of a similarity measurement of the channel state information data set and a similarity measurement of the further channel state information data set. A central processing unit (CPU) 704 is the electronic circuitry within a computer that carries out the instructions of a computer program by performing the basic arithmetic, logic, controlling and input/output (I/O) operations specified by the instructions. A graphics processing unit (GPU) 706 is a specialized electronic circuit designed to rapidly manipulate and alter memory to accelerate the creation of images in a frame buffer intended for output to a display device. GPUs 706 are used in embedded systems, mobile phones, personal computers, workstations, and game consoles. Modern GPUs manipulate computer graphics and image processing and are used for algorithms that process large blocks of data in parallel. A digital signal processor (DSP) 708 is a specialized microprocessor (or a SIP block), with its architecture optimized for the operational needs of digital signal processing. The DSP 708 measures, filters or compresses continuous real-world analog signals. An application program interface (API) 710 is a set of routines, protocols, and tools for building software applications. The API 710 specifies how software components should interact. Additionally, APIs 710 are used when programming graphical user interface (GUI) components. The API 710 provides access to the channel state data to the agent 714. An access point compliant with either 802.11ac or 802.11n or above access point, allow a device to have multiple radio 712 antennas. Multiple radio 712 antennas enable the equipment to focus on the far end device, reducing interference in other directions, and giving a stronger useful signal. This greatly increases range and network speed without exceeding the legal power limits.

An agent 714 is configured to collect data from the Wi-Fi chipset, filter the incoming data then feed and pass the data to the cloud 720 for activity identification. Depending on the configuration, the activity identification can be done on the edge, at the agent level, or in the cloud, or some combination of the two. A local profile database 716 is utilized when at least a portion of the activity identification is done on the edge. This could be a simple motion/no-motion determination profile, or a plurality of profiles for identifying activities, objects, individuals, biometrics, etc. An activity identification module 718 distinguishes between walking activities and in-place activities. In general, a walking activity causes significant pattern changes of the impulse or frequency response of a channel over time for both amplitude and phase, since walking involves significant body movements and location changes. In contrast, an in-place activity (such as watching TV on a sofa) only involves relative smaller body movements that will be captured through small distortions on magnitude and/or phase of CSI.

A cloud 720 analyzes and creates profiles describing various activities. A profile database 722 is utilized when at least a portion of the activity identification is done in the cloud 720. This could be a simple motion/no-motion determination profile, or a plurality of profiles for identifying activities, objects, individuals, biometrics, etc. A device database 724 that stores the device ID of all connected wireless access points. A profile module 726 monitors the data set resulting from continuous monitoring of a target environment, to identify multiple similar instances of an activity without a matching profile in such a data set, combine that data with user feedback to label the resulting clusters to define new profiles that are then added to the profile database 722.

An activity engagement module 728 monitors the output of the activity identification module 718 in order to populate the activity/engagement database 734 with the user activity level (such as pulse or respiration rate) and engagement level (such as the amount of time the user spends watching a TV program, reading a book, engaged in conversation, etc.) over time. A cycle module 730 performs linear operations on (convolution correlation) the data (graphs) of activity levels against the data (graphs) of engagement levels (relaxation/TV, thinking/reading, etc.) for different time periods from the data in the activity/engagement database 734. For example, the patterns over the course of a week or every day or every Monday, in order to identify at what cycle length there are noticeable patterns for the correlation between activity level and engagement level.

An alert module 732 compares the current activity and engagement levels to the cycles identified by the cycle module 730. When the user deviates from the identified cycles, the alert score of the user may be affected. For example, a user has a pattern of being engaged with the TV every Sunday afternoon, and that engagement is correlated with increased respiration rate. The alert module 732 may see that there is an identified cycle for the current time on Sunday afternoon, determine if the user is engaged (e.g., watching TV) and if the activity level (e.g., respiration rate) is what may be expected based upon the identified cycle, and when there is a deviation add points to an alert score. This is done because a single variation from a pattern of behavior does not necessarily indicate an issue, but a series of deviations from identified patterns put together cumulatively is cause for concern when any one of the individual incidents may not prompt an alert from current monitoring systems. The activity/engagement database 734 stores the activity level of the observed user (such as respiration rate, pulse rate, etc.) along with the user level of intellectual or emotion engagement (such as watching TV, reading a book, engaged in conversation, etc.) over time. A cycle database 736 store the cycles identified by the cycle module. Cycles are time periods over which the same pattern of engagement and activity level are shown to repeat. An alert database 738 stores the current alert score of the user being observed along with the rules for who to contact in the event the observed user alert score exceeds a defined threshold(s). The alert database 738 contains the user current alert score, as calculated by the alert module 732, and the actions that need to be taken based upon the current alert score. Table 1 (provided below) illustrates an exemplary alert database 738.

TABLE 1

| Current Alert Score 1.5 | |
| --- | --- |
| Alert Score | Action |
| >2 | Send report to caregiver; send IOT message to confirm condition of user |
| >3 | Send alert to caregiver |

Figure 8:
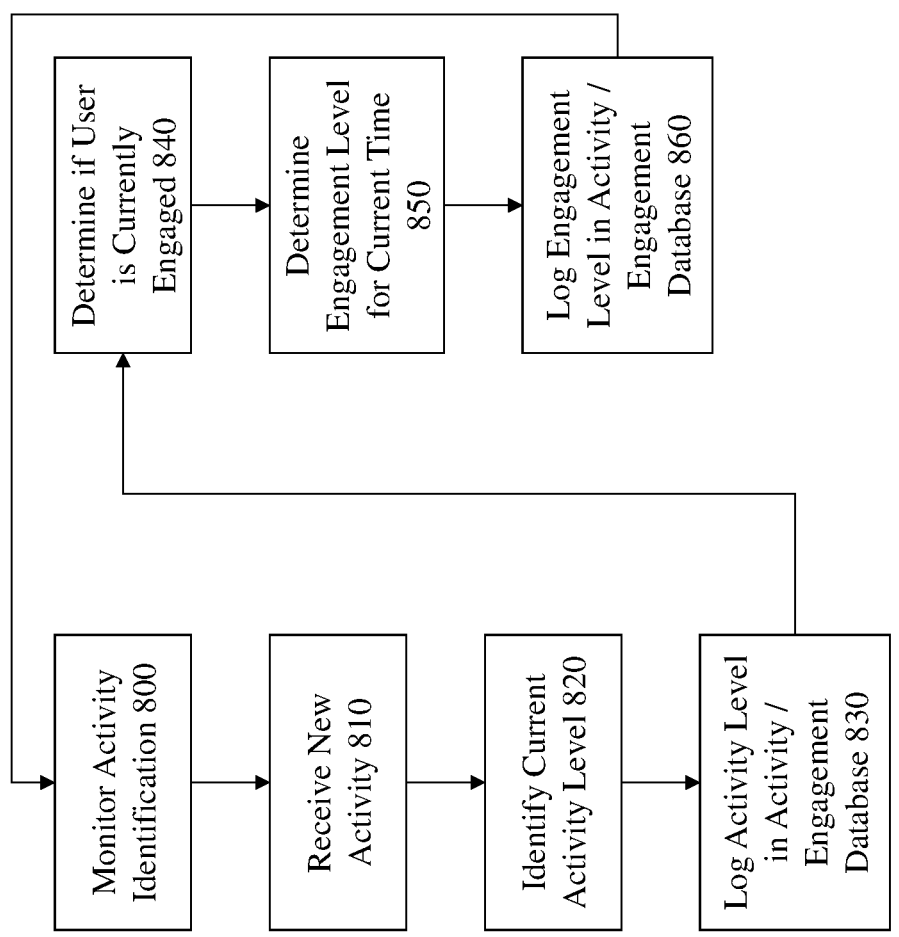
FIG. 8 illustrates an activity engagement module.

Functioning of the activity engagement module 728 is explained with reference to FIG. 8. The activity engagement module may constantly be monitoring the activity identification module 718 for new identified activities in step 800. New identified activities may be received in step 810. The current activity level (such as pulse or respiration rate) may be identified in step 820. The current activity level may be logged for this exemplary respiration rate in the activity/engagement database 734 in step 830. The activity defined by the activity identification module 718 may be used to determine if the user is currently engaged. For the purposes of this application, "engaged" may be inclusive of both emotional and intellectual engagement. Certain activities in the profile database 722 are classified as emotionally or intellectually engaging (such as watching TV, reading a book, engaging in conversation with others, etc.) in step 840. The engagement level may be determined for the current time slice. In this example, the percentage of a given time slice (e.g., five minutes) is taken and the percentage of time the user is engaged in the activity of watching TV is used as the engagement level. For example, the user was watching TV for four out of the five minutes in a time slice. The engagement level for that time slice may be identified as 80% in step 850. The current engagement level may be logged in the activity/engagement database 734. The method may return to monitoring the activity identification module 718 in step 860.

Figure 9:
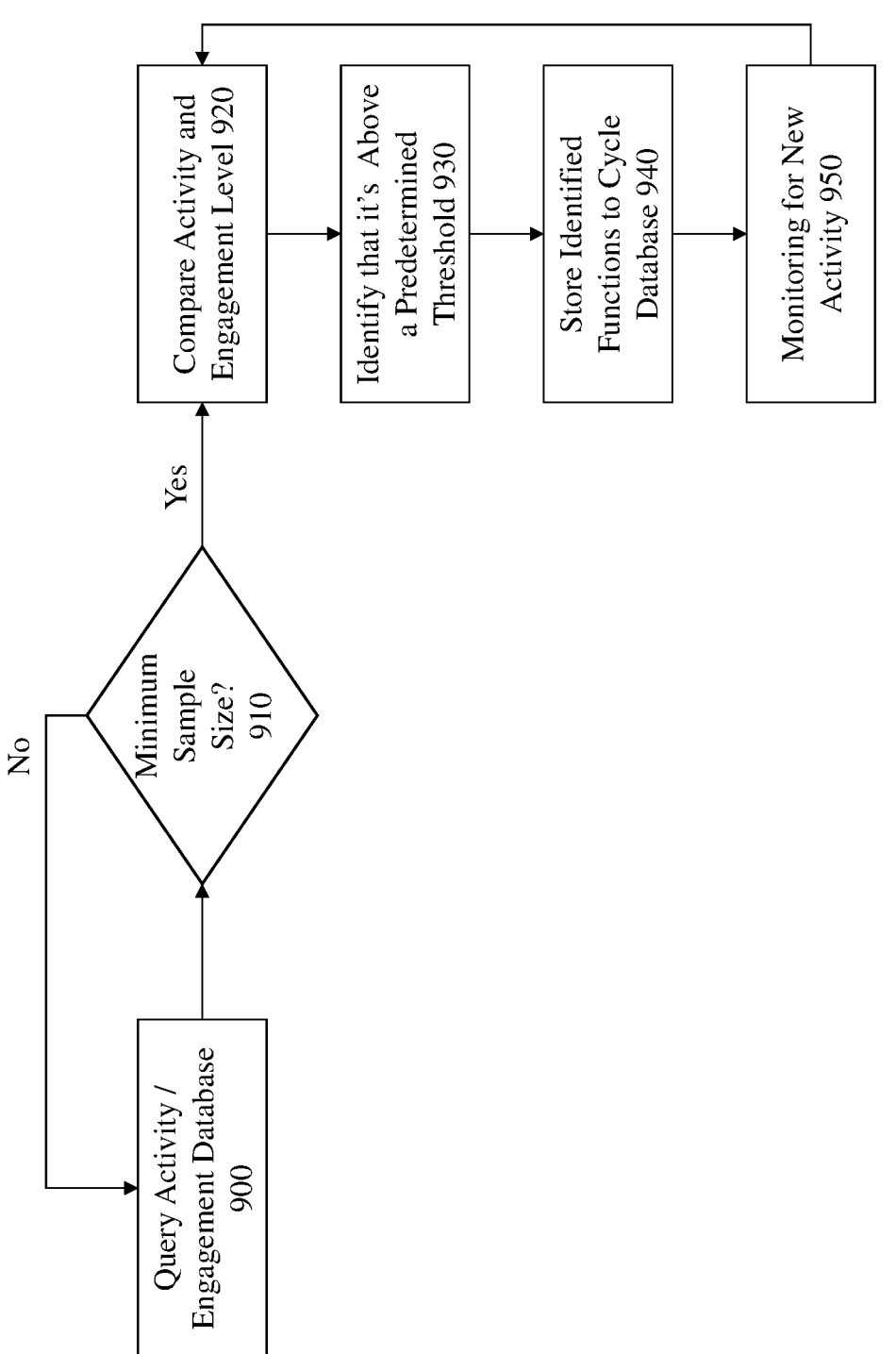
FIG. 9 illustrates a cycle module.

Functioning of the cycle module 730 is explained with reference to FIG. 9. The process begins when the system is installed, and the cycle module 730 begins querying the activity/engagement database 734 for activity data about the user, such as pulse or respiration rate, as well as emotional or intellectual engagement levels of the user, compiled over time by the activity engagement module 728 in step 900. The minimum sample size has been met to begin to identify cycles. Depending upon the application, the minimum sample size could vary widely. For example, a more immobile user may stick to a more strict routine than an independent user.

The system may need a larger sample for the more independent user who is likely to have a greater variety of activities in the routine in step 910. The activity level over time is compared against the engagement level over time for as many different time periods are feasible across the provided sample using at least one statistical means, such as convolution, linear regression, etc. For example, if the minimum sample size was one month, each week could be looked at, or each weekday, or each Monday, or from 1:00 pm to 5:00 pm every Sunday. In this fashion, cycles in the user engagement and activity patterns can be detected and used to identify when a user is breaking routine in step 920. Of the resulting functions from step 920, those that are above the predetermined threshold for statistical significance may be identified (e.g., two function convoluted against each other where the resulting function is at least 80% of a step function) in step 930. The functions identified in step 930 may be written to the cycle database 736 in step 940. The activity/engagement database 734 may be monitored for new data, and the method may return to step 920 to identify new cycles in step 950.

Figure 10:
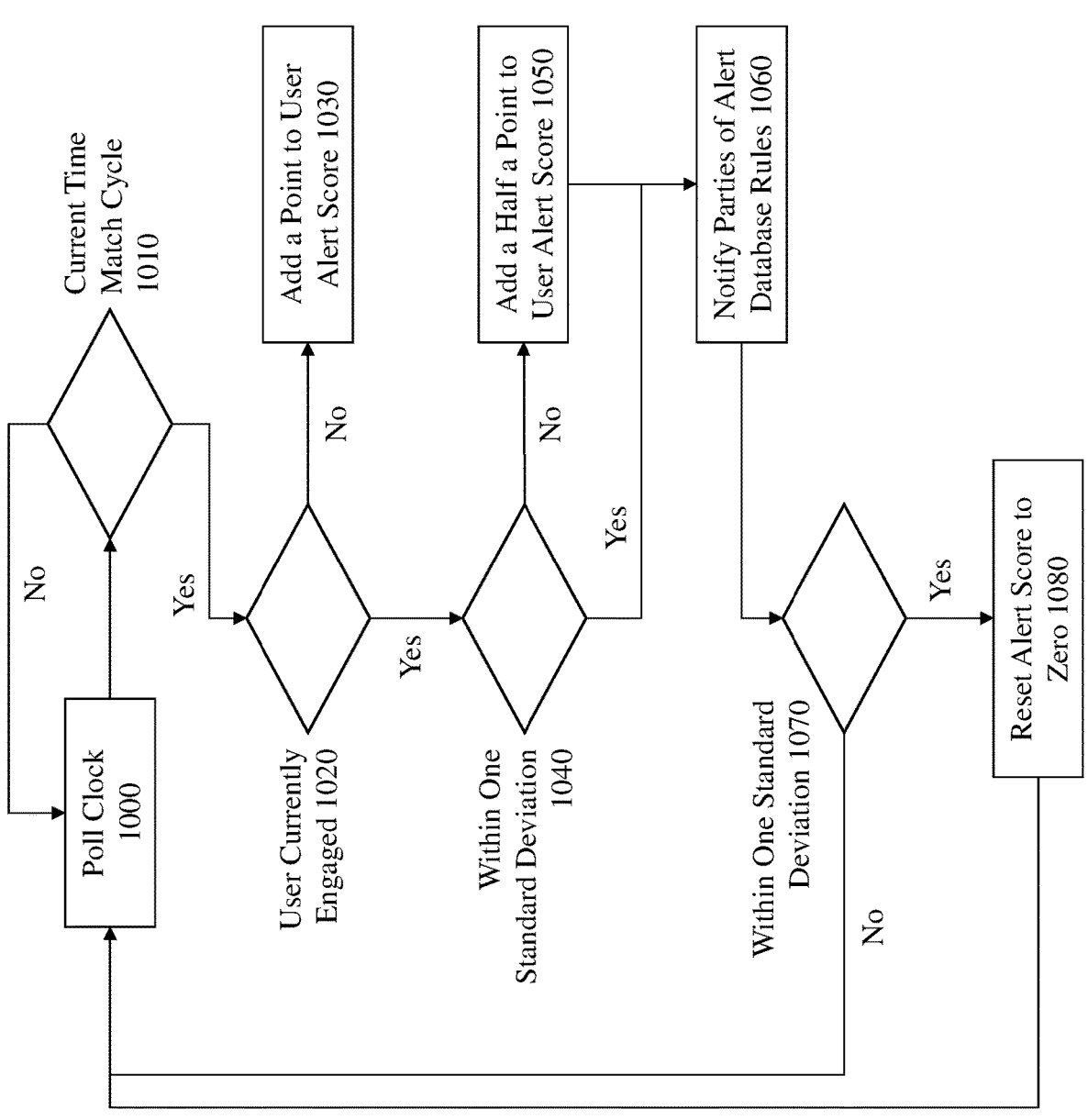
FIG. 10 illustrates an alert module.

Functioning of the alert module 732 is explained with reference to FIG. 10. The alert module 732 is constantly polling the cycle database 736 for newly identified cycles, specifically the times of the identified cycles in step 1000. The alert module 732 polls the system's internal clock to determine the time. The current time may be compared to the time windows of all identified cycles in the cycle database 736. The method may return to polling the clock if the current time does not match in step 1010. If the current time does match an identified cycle, the user is currently engaged (e.g., watching TV) as was expected by the cycle in step 1020. If the user is not engaged as expected, one may be added to the user alert score in the alert database 738 in step 1030. If the user is engaged as expected, the user activity level (e.g., respiration rate) is within one standard deviation of the respiration rate expected by the cycle in step 1040. If the user activity level is outside of the expected range, 0.5 may be added to the user alert score in the alert database 738 in step 1050. Parties may be notified per the rules in the alert database 738 based upon the user current alert score. For example, the user may not be engaged in the first observed cycle (adding one to the user's alert score), but the user was engaged in the second cycle with a respiration rate that was lower than normally seen in the identified cycle (adding 0.5 to the alert score), while the third cycle shows the user was again not engaged (adding one to the alert score). This brings the exemplary user alert score over the first threshold of 2 in the alert database. The third time being off-cycle may trigger a report to be sent to designated recipients (e.g., caregiver(s) of the user) indicating that the user is deviating from the routines. Optionally, a message may be sent to the recipient via an IoT device in the home to check on the subject user. During the fourth cycle, the user may be engaged, but again have a respiratory rate below the expected level (adding 0.5 to the alert score) and triggering the second threshold of responses in the alert database 738. An alert may be sent to the caregiver(s) in step 1060. In step 1070, the alert module 732 determines if the user alert score has reached 3. Once the alert score has reached 3 (or other chosen threshold for caregiver intervention), the alert score is reset to 0 at step 1080.

One skilled in the art may appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:

receiving channel state information (CSI) data of received wireless signals by a wireless enabled device associated with a sensed area comprising a plurality of components, each component associated with a sub-carrier and antenna of the wireless enabled device; and executing a process upon the received channel state information to establish a decision where the process is performed by a system comprising at least a microprocessor, wherein the process comprises determining a first feature, the first feature being a count of components of the plurality of components having a frequency component within a defined frequency range, wherein the decision whether a user is present within the sensed area is established in dependence upon the first feature exceeding a threshold value, and wherein the defined frequency range is between 0.17 Hz and 0.70 Hz.

2. The method according to claim 1, wherein the threshold value is established in dependence upon values of the first feature established when the sensed area is unoccupied.

3. A method comprising:

receiving channel state information (CSI) data of received wireless signals by a wireless enabled device associated with a sensed area comprising a plurality of components, each component associated with a sub-carrier and antenna of the wireless enabled device; and executing a process upon the received channel state information to establish a decision where the process is performed by a system comprising at least a microprocessor, wherein the process comprises determining a first feature, the first feature being an average amplitude of components of the plurality of components having a frequency component within a defined frequency range, wherein the decision whether a user is present within the sensed area is established in dependence upon the first feature exceeding a threshold value, and wherein the defined frequency range is between 0.17 Hz and 0.70 Hz.

4. The method according to claim 3, wherein the threshold value is established in dependence upon values of the first feature established when the sensed area is unoccupied.

5. A method comprising:

receiving channel state information (CSI) data of received wireless signals by a wireless enabled device associated with a sensed area comprising a plurality of components, each component associated with a sub-carrier and antenna of the wireless enabled device; and executing a process upon the received channel state information to establish a decision where the process is performed by a system comprising at least a microprocessor, wherein the process comprises:

determining a first feature, the first feature being a count of components of the plurality of components having a frequency component within a defined frequency range, and determining a second feature, the second feature being an average amplitude of components of the plurality of components having the frequency component within the defined frequency range, wherein the decision whether a user is present within the sensed area is established in dependence upon the first feature exceeding a first threshold value and the second feature exceeding a second threshold value, and wherein the defined frequency range is between 0.17 Hz and 0.70 Hz.

6. The method according to claim 5, wherein the first threshold value and the second threshold value are established in dependence upon values of the first feature and the second feature established when the sensed area is unoccupied.

7. A method comprising:

receiving channel state information (CSI) data of received wireless signals by a wireless enabled device associated with a sensed area comprising a plurality of components, each component associated with a sub-carrier and antenna of the wireless enabled device; and executing a process upon the received channel state information to establish a decision where the process is performed by a system comprising at least a microprocessor, wherein the process comprises:

determining on an ongoing basis with an activity identification module forming part of the system a current activity of a user within the sensed area in dependence upon a comparison of the CSI data against one or more CSI information data sets forming part of one or more CSI profiles for each activity profile of a plurality of activity profiles, determining on the ongoing basis a current activity level of the user and a current engagement level of the user, populating on the ongoing basis a database with activity level of the user and the engagement level of the user, and determining a deviation of the current activity level of the user and a current engagement level of the user with respect to one or more patterns of user behaviour previously established for the user.

8. The method according to claim 7, wherein the one or more patterns of user behaviour previously established for the user were established by processing the stored activity level of the user and the engagement level of the user within the database over one or more defined time periods to identify one or more patterns of user behaviour within each defined time period of the one or more defined periods by correlating of the stored activity level of the user and the engagement level of the user within the database over each defined time period of the one or more defined periods for a period of time.

9. The method according to claim 7, wherein the activity level is a respiration rate established by processing the plurality of components to identify a frequency component within a defined frequency range.

10. The method according to claim 9, wherein the defined frequency range is between 0.17 Hz and 0.70 Hz.

11. The method according to claim 7, wherein the activity level is a pulse rate.

12. The method according to claim 7, further comprising:

upon determining the deviation of the current activity level of the user and the current engagement level of the user with respect to the one or more patterns of user behaviour previously established for the user, increasing a user alert score by an amount of a plurality of amounts; and comparing the updated user alert score against one or more thresholds and, upon determining the updated user alert score has exceeded a threshold of the one or more thresholds, establishing one or more communications to one or more parties established by a rule associated with the threshold of the one or more thresholds stored within an alert database.

13. The method according to claim 12, wherein each amount of the plurality of amounts is established in dependence upon a defined deviation of at least one of the current activity level of the user and the current engagement level of the user relative to a pattern of the one or more patterns of user behaviour.

14. The method according to claim 12, wherein each amount of the plurality of amounts is established in dependence upon a number of sequential deviations of at least of the current activity level of the user and the current engagement level of the user relative to a pattern of the one or more patterns of user behaviour.

15. The method according to claim 12, wherein each amount of the plurality of amounts is established in dependence upon a deviation of the current activity level of the user whilst the current engagement level of the user indicates that the user is engaged during a pattern of the one or more patterns of user behaviour.

* * * * *